United States Patent
Chimento et al.

(10) Patent No.: US 8,503,202 B2
(45) Date of Patent: Aug. 6, 2013

(54) MODULAR VOLTAGE SOURCE CONVERTER

(75) Inventors: Filippo Chimento, Vasteras (SE); Frans Dijkhuizen, Skultuna (SE); Jean-Philippe Hasler, Vasteras (SE); Falah Hosini, Vasteras (SE); Tomas Jonsson, Vasteras (SE); Peter Lundberg, Vasteras (SE); Mauro Monge, Vasteras (SE); Staffan Norrga, Stockholm (SE); Jan R. Svensson, Vasteras (SE); Fredrik Tinglow, Arboga (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/229,461

(22) Filed: Sep. 9, 2011

(65) Prior Publication Data

US 2012/0063181 A1   Mar. 15, 2012

Related U.S. Application Data

(63) Continuation of application No. PCT/EP2009/052885, filed on Mar. 11, 2009.

(51) Int. Cl.
*H02H 7/122* (2006.01)

(52) U.S. Cl.
USPC ...................................................... 363/56.03

(58) Field of Classification Search
USPC ............. 363/56.02, 56.03, 56.04, 56.05, 132, 363/136
See application file for complete search history.

(56) References Cited

U.S. PATENT DOCUMENTS

| 5,737,200 A * | 4/1998 | Miyashita et al. ......... 363/56.03 |
| 5,986,909 A * | 11/1999 | Hammond et al. ............. 363/65 |
| 2005/0219879 A1 * | 10/2005 | Bixel .............................. 363/71 |
| 2006/0158914 A1 * | 7/2006 | Schreiber et al. ............. 363/125 |
| 2010/0133901 A1 * | 6/2010 | Zhang et al. .................... 307/11 |

FOREIGN PATENT DOCUMENTS

| DE | 10323220 A1 | 12/2004 |
| DE | 102005040543 A1 | 3/2007 |
| WO | 2008074274 A1 | 6/2008 |

OTHER PUBLICATIONS

Callison; "An Evaluation of the Cascaded H-Bridge Multilevel Inverter Topology for Direct-Drive Synchronous Wind Farm Applications"; A Thesis Presented for the Master of Science Degree in Electrical Engineering; May 2006; pp. 18-22.
International Preliminary Report on Patentability; Application No. PCT/EP2009/052885; Issued: Jun. 15, 2011; 15 pages.
International Search Report and Written Opinion of the International Searching Authority; Application No. PCT/EP2009/052885; Issued: Jul. 8, 2009; 14 pages.
Ainsworth, et al.; "Static VAr Compensator (STATCOM) Based on Single-Phase Chain Circuit Converters"; IEE Proceedings: Generation, Transmission, and Distribution, Institution of Electrical Engineers; vol. 145, No. 4; Jul. 15, 1998; pp. 381-386.

* cited by examiner

*Primary Examiner* — Nguyen Tran
(74) *Attorney, Agent, or Firm* — St. Onge Steward Johnston & Reens LLC (57) ABSTRACT

Voltage source converter based on a chain-link cell topology including one or more phases, each of the phases having one or more series-connected chain-link cell modules connected to each other. The output voltage of the voltage source converter is controlled by control signals applied to the series-connected chain-link cell modules. In case of failure of a chain-link cell module, that module is controlled, by the control signals, such that zero output voltage is provided at its output voltage AC terminal.

16 Claims, 8 Drawing Sheets

MODULAR VOLTAGE SOURCE CONVERTER

CROSS-REFERENCE TO RELATED APPLICATIONS

The present application is a continuation of pending International Patent Application PCT/EP2009/052885 filed on Mar. 11, 2009 which designates the United States, and the content of which is incorporated herein by reference.

FIELD OF THE INVENTION

The invention generally relates to the field of power compensation in a high-voltage power network, and in particular to a modular voltage source converter and to a chain-link cell module for a voltage source converter according to the preambles of the independent claims. In addition the invention relates to a method in a voltage source converter.

BACKGROUND OF THE INVENTION

Modern society relies heavily upon electricity. With deregulation and privatisation, electricity has become a commodity as well as a means for competition. Power quality, as a consequence, is coming into focus to an extent hitherto unseen. Disturbances emanating from any particular load will travel far, and, unless properly remedied, spread over the grid to neighbouring facilities. A traditional way to deal with the problem of poor or insufficient quality of power distribution is to reinforce the grid by building new lines, installing new and bigger transformers, or moving the point of common coupling to a higher voltage level.

Such measures, however, are expensive and time-consuming, if they are at all feasible. A simple, straightforward and cost-effective way of power quality improvement in such cases is to install equipment especially developed of the purpose in the immediate vicinity of the source(s) of disturbance. As an additional, very useful benefit, improved process economy will often be attained enabling a profitable return on said investment.

Within flexible alternating current transmission systems (FACTS) a plurality of control apparatus are known. One such FACTS apparatus is the static compensator (STATCOM). A STATCOM comprises a voltage source converter (VSC) having an AC side connected to the AC network (transmission line) via an inductor in each phase. The DC side is connected to a temporary electric power storage means such as capacitors. In a STATCOM the voltage magnitude output on the AC side is controlled thus resulting in the compensator supplying reactive power or absorbing reactive power from the transmission line. With zero active power transfer, the voltage over the DC capacitors is constant when assuming that the converter losses are negligible. The VSC comprises at least six self-commutated semiconductor switches, each of which is shunted by a reverse or anti-parallel connected diode. A STATCOM apparatus with no active power source can only compensate for reactive power, balancing load currents and remove current harmonics in point of common connection by injecting current harmonics with opposite phase.

By bringing together STATCOM and IGBT (Insulated Gate Bipolar Transistor) technologies, a compact STATCOM with reactive power compensation is obtained which offer possibilities for power quality improvement in industry and power distribution. This performance can be dedicated to active harmonic filtering and voltage flicker mitigation, but it also allows for the compact STATCOM to be comparatively downsized, its footprint can be extremely small. The grid voltage profile may be controlled according to a given optimal characteristic, and the result is an enhanced grid capacity with a more stable, strengthened and predictable behavior. One example where the compact STATCOM, has proven to be very useful is in the steel making industry. An electric arc furnace (EAF) is a piece of equipment needed to make steel products. For the grid owner and for the supplier of electricity, the EAF user is a subscriber to power, i.e. a customer, but in the worst case also a polluter of the grid. Out of the EAF may well come an abundance of distortion such as voltage fluctuations, harmonics and phase asymmetry. Also, the grid may be subject to carrying large amounts of reactive power, which is unintended and gives rise to transmission and distribution losses as well as impedes the flow of useful, active power in the grid.

An electric arc furnace is a heavy consumer not only of active power, but also of reactive power. Also, the physical process inside the furnace (electric melting) is erratic in its nature, with one or several electrodes striking electric arcs between furnace and scrap. As a consequence, the consumption especially of reactive power becomes strongly fluctuating in a stochastic manner. The voltage drop caused by reactive power flowing through circuit reactances in the electrodes, electrode arms and furnace transformer therefore becomes fluctuating in an erratic way, as well. This is called voltage flicker and is visualized most clearly in the flickering light of incandescent lamps fed from the polluted grid.

The problem with voltage flicker is attacked by making the erratic flow of reactive power through the supply grid down into the furnaces decrease. This is done by measuring the reactive power consumption and generating corresponding amounts in the compact STATCOM and injecting it into the system, thereby decreasing the net reactive power flow to an absolute minimum. As an immediate consequence, voltage flicker is decreased to a minimum, as well.

Important added benefits are a high and constant power factor, regardless of load fluctuations over furnace cycles, as well as a high and stable bus RMS voltage. These benefits can be capitalized as improved furnace productivity as well as decreased operational costs of the process in terms of lower specific electrode and energy consumption and reduced wear on the furnace refractory.

To parry the rapidly fluctuating consumption of reactive power of the furnaces, an equally rapid compensating device is required. This is brought about with the state of the art power electronics based on IGBT technology. With the advent of such continuously controllable semiconductor devices capable of high power handling, VSCs with highly dynamic properties have become feasible far into the 100 MVA range.

The function of the VSC in this context is a fully controllable voltage source matching the bus voltage in phase and frequency, and with an amplitude which can be continuously and rapidly controlled, so as to be used as the tool for reactive power control.

The input of the VSC is connected to a capacitor, which is acting as a DC voltage source. At the outputs, the converter is creating a variable AC voltage. This is done by connecting the voltages of the capacitor or capacitors directly to any of the converter outputs using the valves in the VSC. In converters that utilise Pulse Width Modulation (PWM), the input DC voltage is normally kept constant when creating output voltages that in average are sinusoidal. The amplitude, the frequency and the phase of the AC voltage can be controlled by changing the switching pattern.

In the compact STATCOM, the VSC uses a switching frequency greater than 1 kHz. The AC voltage across the reactor at full reactive power is only a small fraction of the AC voltage, typically 15%. This makes the compact STATCOM close to an ideal tool for fast reactive power compensation.

For the compact STATCOM, the IGBT has been chosen as the most appropriate power device. IGBT allows connecting in series, thanks to low delay times for turn-on and turn-off. It has low switching losses and can thus be used at high switching frequencies. Nowadays, devices are available with both high power handling capability and high reliability, making them suitable for high power converters. Instead of the IGBTs another possibility is to use Gate Turn-Off thyristors (GTO), Integrated Gate Commutated Thyristors (IGCT), MOSFET or any self commutated device.

As only a very small power is needed to control the IGBT, the power needed for gate control can be taken from the main circuit. This is highly advantageous in high voltage converters, where series connecting of many devices is used. At series connection of IGBTs, a proper voltage division is important. Simultaneous turn-on and turn-off of the series connected devices are essential.

Figure 1:
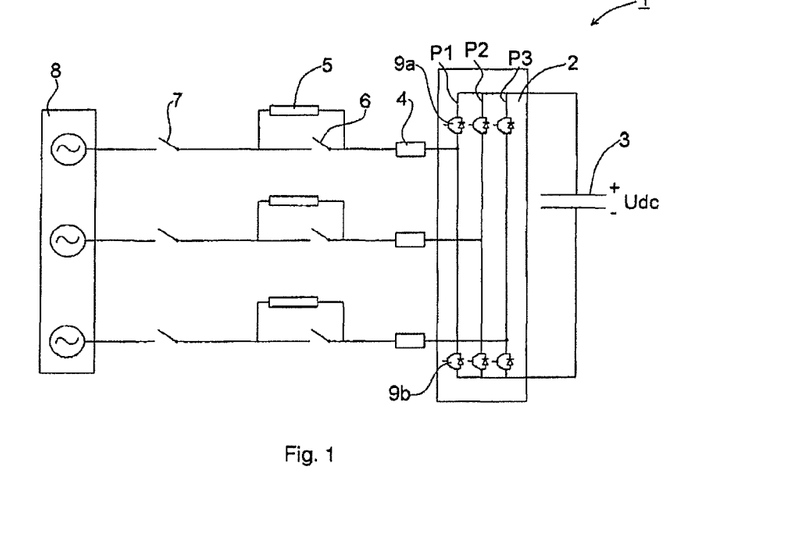
FIG. 1 illustrates a prior art two-level static compensator.

The converter topology for a compact STATCOM may be a two level configuration. In a two-level converter the output of each phase can be connected to either the positive pole or the negative pole of the capacitor. The DC side of the converter is floating, or in other words, insulated relative to ground. The two-level topology makes two numbers of output voltage combinations possible for each phase on the AC-side. One such converter topology is shown in FIG. 1.

An alternative to series connection of valve positions to achieve the necessary voltage rating is to connect converter cells in series. In this way smoother AC current and AC voltage waveforms are possible to obtain with lower switching frequency and minimal filtering. One such arrangement is series connection of single phase full-bridge converters, which sometimes are referred to as chain-link cells.

A chain-link based converter comprises a number of series-connected cell modules, each cell comprising a capacitor, besides the valves. The DC-capacitor of each such cell module is rather big compared to the above described two-level static compensator, when seen in relation to the total effect of the system.

Figure 2:
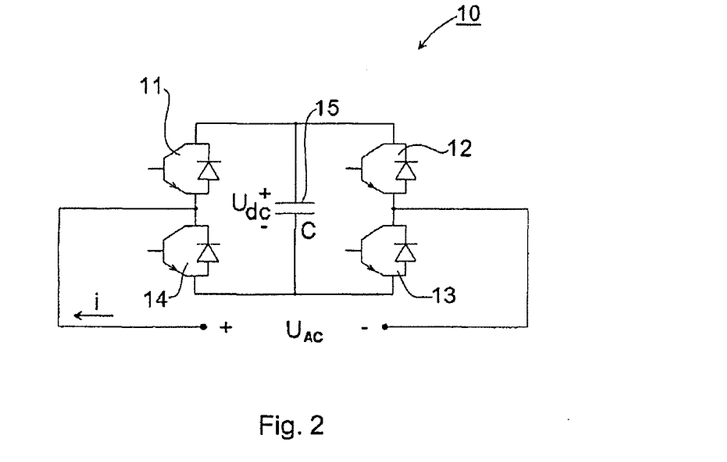
FIG. 2 illustrates a cell module of a chain-link voltage source converter.
Figure 3:
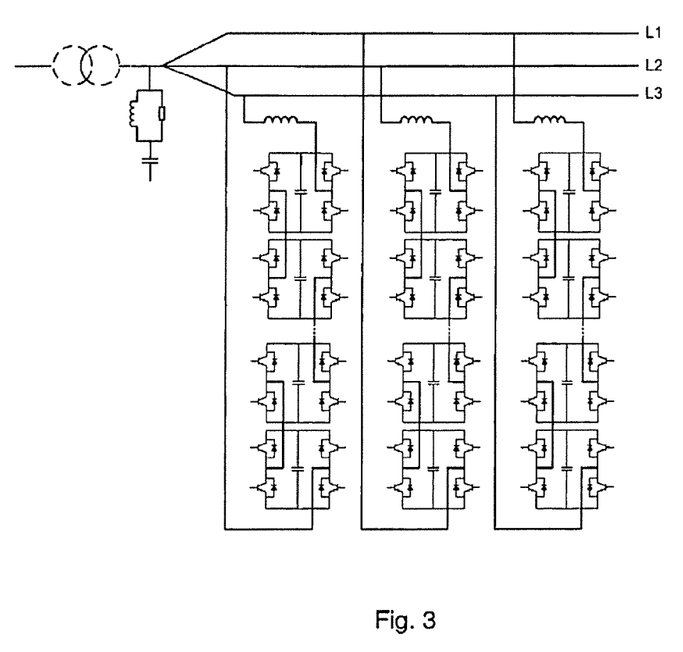
FIG. 3 shows a general single line diagram for a delta connected arrangement comprising a number of chain-link cell modules in series.

A chain-link cell module may consists of four IGBT positions and a DC link Capacitor bank as shown schematically in FIG. 2. Each of the three VSC phases consists of a number of chain-link cells, here shown in series in the general diagram of FIG. 3 for a delta connected arrangement. The phases can also be connected in an Y-arrangement.

The number of cells in series in each phase is proportional to the AC voltage rating of the system and can, for high AC voltage systems, consequently include a large number of cells.

It is necessary with such high power systems with many cell modules in series to continue operation of the system with failed cell modules in circuit in order to achieve a reasonably high MTTR (Mean Time To Repair). To allow for this failure mode of operation the inventors have identified a number of requirements:

A number of redundant cell modules are needed to achieve the required MTTR figures.

The failed cell module must be bypassed in a safe way while the system is in operation.

The system is kept operational for the duration of the service interval despite failed cell modules.

The failed cell modules are then replaced during scheduled maintenance.

Figure 4:
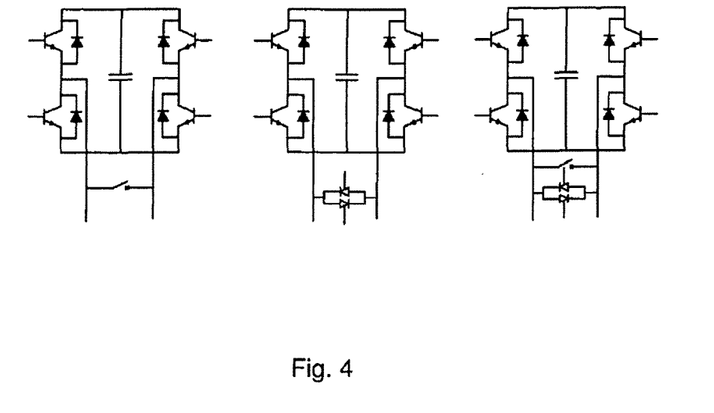
FIG. 4 illustrates three examples of prior art solutions for short circuiting a cell module.

To be able to bypass a faulty cell module, it is necessary to provide zero voltage across the AC terminals of the cell. This can be achieved by using a very fast mechanical switch or a solid-state relay (bidirectional thyristor) or a combination of the two above solutions to allow for low power losses as shown in FIG. 4 where these known solutions are illustrated.

One example of a device for protecting converter modules is disclosed in WO-2008/125494 where each submodule of the device is associated with a short circuit device, e.g. a vacuum switching tube, for short circuiting the submodule. The short circuit device enables safe bridging of a defective submodule.

The common features of these methods are that they require additional and controllable components to be introduced which inter alia adds on costs and complexity to the system.

Thus, the object of the present invention is to remove the above drawbacks.

SUMMARY OF THE INVENTION

The above-mentioned object is achieved by the present invention according to the independent claims.

Preferred embodiments are set forth in the dependent claims.

A major advantage of the present invention is that non faulty cell components of a cell module are continued to be used without adding on extra circuitry that require active control.

According to the present invention embodiments are disclosed for utilizing a faulty cell module despite a single failure to provide zero voltage at the terminals of the faulty cell module.

According to the invention it is assumed that when a fault occurs in the cell it only affects one phase leg of a cell module. Therefore it is possible to operate the non-faulty phase leg in such a way that it can provide zero output voltage across its AC terminals.

According to the embodiments of the present invention there are included a control algorithm for operating the faulty cell module to achieve zero output voltage, the algorithm is discussed in the detailed part of the description.

The modular VSC according to the invention may be used for example to control the voltage on the network (e.g. a transmission network, a sub transmission network or a distribution network), by consuming or injecting reactive power to the network.

The present invention will now be described in detail by references to the appended drawings.

DETAILED DESCRIPTION OF THE INVENTION

FIG. 1 illustrates a prior art two-level static compensator 1 without any transformers to step down the power network voltage. The static compensator 1 comprises a VSC 2 connected at its DC side to a capacitor 3 and at its AC-side to a power network 8, also denoted grid.

The conventional two-level VSC 2 comprises three phases P1, P2, P3 (the phases are denoted L1, L2, L3 when describing the present invention), each phase consisting of two series-connected valves. The two valves of phase P1 are indicated at reference numerals 9a, 9b. Each valve 9a, 9b in turn comprises a transistor with an anti-parallel diode, or rather, in order to manage high voltages, each valve comprises a number of series-connected transistors, for example IGBTs, each IGBT having an anti-parallel diode.

The VSC 2 is connected to the grid 8, in FIG. 1 comprising a three phase network, via a phase reactor 4, via an optional starting resistor 5 connected in parallel with a switch 6 and via an AC circuit breaker 7 in each phase, if the current is too high for the converter. Each phase, or at least two of them, comprises such phase reactor, starting resistor (if needed), switch and circuit breaker. The respective phases are connected to the middle point of the respective phase P1, P2, P3, i.e. connected between the respective valves as illustrated in the figure. It is possible to reduce the number of components by equipping (if needed) only two of the phases with the starting resistor connected in parallel with the switch. Only one phase is described in the following in order to simplify the description, but it is understood that the phases are similar.

When the grid-connected VSC 2 is to be energized and started, the circuit breaker 7 is switched so as to provide a current path from the grid 8 through, if needed, the starting resistor 5, the phase reactor 4, and through the diodes of the VSC 2 so as to charge the capacitor 3. When the capacitor voltage has reached a predetermined level, the starting resistor 5 is short-circuited by closing the parallel-connected switch 6. As the starting resistor 5 is short-circuited, the capacitor voltage will increase a bit more and when it is high enough, the valves of the VSC 2 are deblocked and start to switch. The capacitor voltage is then controlled up to its reference value.

The starting resistor 5 is provided in order to protect the diodes of the VSC 2 from being damaged by a too high and/or too long-lasting current surge, which could occur upon closing the AC circuit breaker 7 without the use of the starting resistor 5.

The stress put on the valves, and in particular the diodes, of the VSC 2 depends on several factors, for example the size of the DC-side capacitor 3, the size of the phase reactors 4 and on the voltage levels of the power network 8.

FIG. 2 illustrates one converter cell module, also denoted converter link or chain-link cell module, of a modular voltage converter applicable in the present invention. The cell module 10 comprises four valves 11, 12, 13, 14, each valve including a transistor switch, such as an IGBT. In the following an IGBT is used as an example, but it is noted, as mentioned above, that other semiconductor devices could be used, for example Gate Turn-Off thyristors (GTO), Integrated Gate Commutated Thyristors (IGCT), MOSFET or any self commutated device. A free-wheeling diode, also denoted anti-parallel diode, is connected in parallel with each IGBT. The diode conducts in the opposite direction of the IGBT. The valves 11, 12, 13, 14 are connected in a full-bridge arrangement with a capacitor unit 15.

The present invention will now be further described. As soon as a fault in a cell module is detected (this can be a gate unit failure or an IGBT failure), the corresponding phase leg in the cell is blocked, the type of failure is diagnosed using the information provided by the available sensors in the different gate units of the cell and the healthy phase leg is then operated accordingly to provide zero output voltage. This is achieved under the control of a fault handling control algorithm in synchronism with the phase current and devices are switched at zero current crossover for operating the faulty cell module to achieve zero output voltage. This means in practice that the non-faulty phase leg is switched at fundamental frequency.

Figure 5:
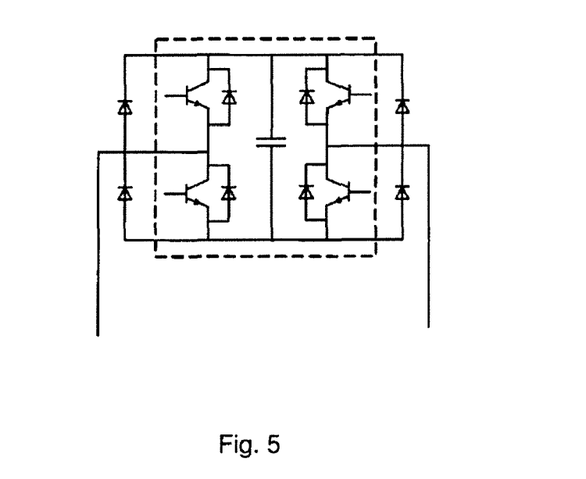
FIG. 5 illustrates a cell module according to the preferred embodiment of the present invention.

Thus, two design principles are used for the cell construction:
1. The IGBT modules used are of the short circuit failure mode types (such as the ones used in series connection of IGBTs) so that the device goes into a short circuit when failing. In this case the cell module will be operated with the zero voltage control without any additional components by using the faulty phase leg of the cell module to provide current path through the shorted IGBT or the diodes of the positions (if the IGBT is open circuited or the gate unit is faulty).
2. Standard industrial IGBT modules are used which can go into open circuit when failing. It is in this case more likely that even the parallel diode is damaged and cannot be used. Therefore, in this case a single phase diode rectifier is connected in parallel (but protected from the cell) with each cell as shown in FIG. 5 in order to allow current paths when the faulty cell is operated in a zero voltage mode.

The invention will now be described in particular with references to FIG. 8. Thus, the voltage source converter (VSC) which is based on a chain-link cell topology comprises one or more phases (L1, L2, L3), where each of said phases comprising one or more series-connected chain-link cell modules (three in FIG. 8) connected to each other. Each cell module includes four IGBTs, each provided with one gate unit (GU), and each cell module is assigned a cell control and protection unit which in turn is connected to the converter control and protection device to which all units are connected.

An output voltage of the voltage source converter is controlled by control signals, generated by the control and protection device, applied to said cell modules. In case of failure of a chain-link cell module that module is controlled, by the control signals, such that zero output voltage is provided at its output voltage AC terminal ($U_{AC}$). The control and protection device (responsible for controlling the entire system) receives a fault signal from a cell control and protection unit. The cell control and protection unit receives information from available sensors of the cell. The information includes e.g. the cell DC voltage, the cell AC current and the health status of the components of the cell. The cell control and protection unit then identifies the type of failure from the sensor signals and information of the type of failure is included in the fault signal.

Figure 7:
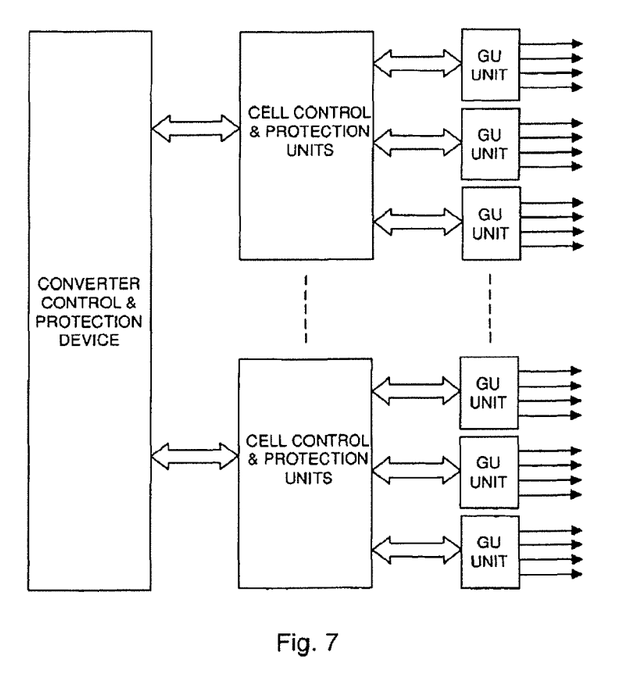
FIG. 7 is a schematic general block diagram of a voltage source converter according to the present invention.

FIG. 7 is a schematic general block diagram of a voltage source converter according to the present invention and the figure illustrates in particular the control structure of the voltage source converter. In the figure a GU unit represents the GUs for one cell module and the arrows represent the control of the cell module. The cell control and protection units include the control and protection units of one phase.

Figure 8:
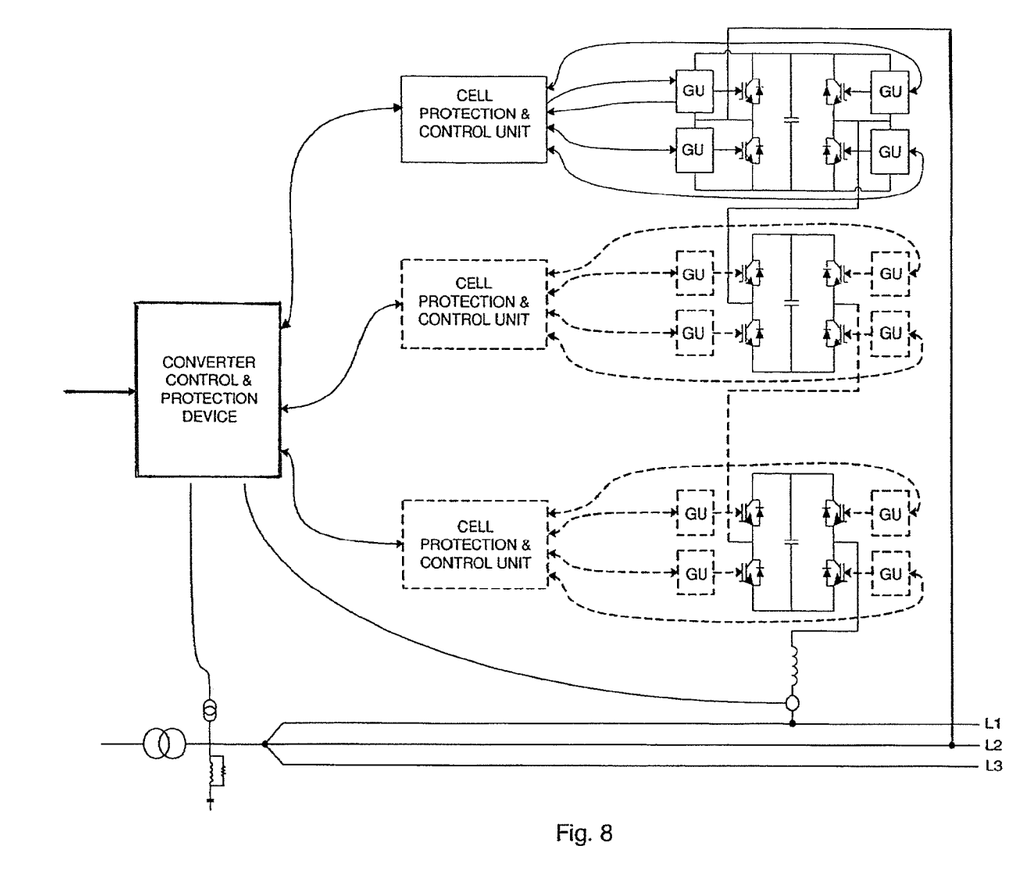
FIG. 8 is a schematic block diagram of a voltage source converter where the present invention is implemented.

As indicated above in relation to FIG. 8 the cell control and protection units supervise the function of the cell modules by analysing the data obtained from the cell module and coordinates the control of the GUs of one cell. These units are then connected to the converter control and protection device which is responsible for the overall control of the voltage source converter by applying the fault handling control algorithm.

As an alternative the GUs may be directly connected to the converter control and protection device and in that case all functionality of the cell control and protection unit may then be performed by that device.

When designing the voltage converter according to the present invention a number of redundant cell modules are needed in order to maintain the system in operation despite one or more faulty cell modules which have zero output voltage. The output voltage from each non-faulty cell module is controlled such that there is a possibility to increase its output voltage in order to compensate the voltage loss from failing cell modules. By arranging a number of redundant cell modules, where the number is related to known failure probability of a cell module and the output voltage demand, the system is kept operational for the duration of the service interval and the failed cell modules may then be replaced during scheduled maintenance (assumed as one year).

In the following different types of cell operation under fault conditions are presented and the requirements for continuous operation of the faulty cell under different fault modes of the IGBT are listed.

As an example the maximum used phase current is 1.8 kA rms at 50 Hz.

As soon as a fault is detected by the control and protection device either through receiving an error message from the GU included in a fault signal or establishing by other means that a fault has occurred in an IGBT position, or if a GU does not respond, the phase leg with the faulty position is immediately blocked and the other phase leg is driven to provide zero AC voltage applying fundamental switching frequency. A new lower DC voltage reference is given to this faulty cell in order to reduce the voltage stresses on the other components of the cell. This safety voltage level should be as low as possible without affecting the energization of the GU. At this moment this DC voltage level is estimated to be in the range of 500V-1000V.

A fault in a cell can be any one of a number of different types of faults.

The initial action of the control and protection unit as a fault is detected is to enter into a diagnostic mode in order to determine which failure type has occurred. The result of the failure type detection indicates which failure mode to be used. These are briefly outlined in the following, which all are related to case 1 above, and with references to FIGS. 9 and 10. In these figures are shown the currents through relevant IGBTs of the cell module (to the right in the figures) and also the phase current and the transistor switching signal (below in the figures).

Figure 9:
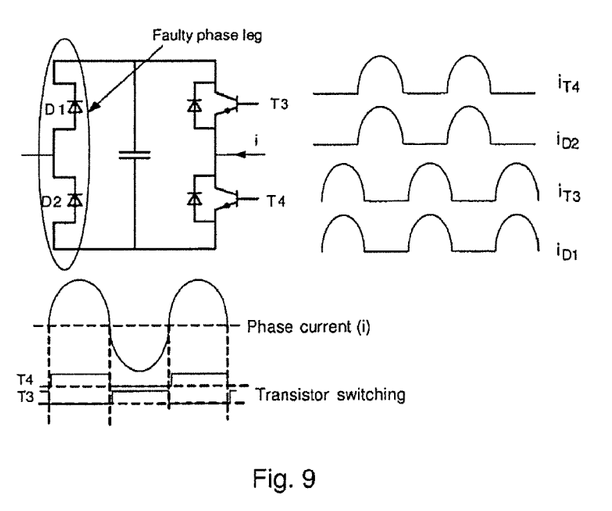
FIG. 9 illustrates one mode of operation of the present invention.

Mode 1: Healthy Diodes
  If the diodes in the faulty phase leg are healthy and the IGBTs are not short circuited, the other phase leg of the faulty cell will then be operated at fundamental switching frequency to provide zero output voltage at the AC terminals in synchronism with the line current as shown in FIG. 9.

This fundamental switching frequency operation of the phase leg continues until next service period (estimated as one year), unless a second failure occurs. Note that this operating mode can also be implemented when one of the GUs are out of function.

Figure 10:
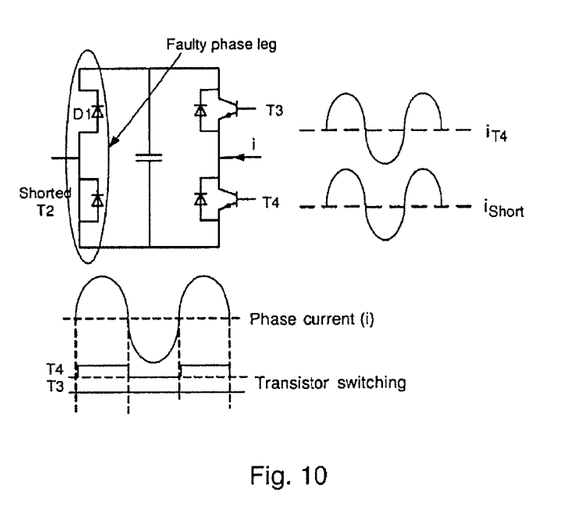
FIG. 10 illustrates a second mode of operation of the present invention.

Mode 2: Shorted IGBT
  If the IGBT in T2 is short circuited, then the zero output voltage will be achieved by only switching T4 while keeping T3 turned off as shown in FIG. 10. Therefore in this case the phase current will only flow in T4 and the shorted IGBT. T3 and D1 will not carry any current.

Figure 6:
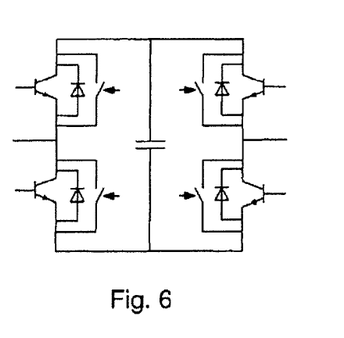
FIG. 6 illustrates a cell module according to an embodiment of the present invention.

With references to FIG. 6 a further embodiment of the present invention will be described in the following.

Herein, each valve position is provided with a mechanical bypass switch that may be remotely or manually controlled so that when the switch is closed a faulty valve is bypassed. The bypass switch is closed in response of a bypass switch control signal generated by the GU (not shown in the figure) thus being responsible for the control of the switch. Preferably the bypass switch control signal is applied to the bypass switch via an optical cable. An advantage with this embodiment is that the cost of such a closing switch is low due to that no special requirement regarding speed of operation etc. is required.

The closing of the switch provides a low loss path for the current through the faulty cell. Since each valve position is provided with a bypass switch, it is also possible to close a second switch allowing the current to bypass the faulty cell completely. The two switches may be the ones across the lower valves or across the upper valves.

The present invention also relates to a method in a voltage source converter based on a chain-link cell topology, said converter comprising one or more phases (L1, L2, L3). Each of the phases comprising one or more series-connected chain-link cell modules connected to each other. The output voltage of the voltage source converter is controlled by control signals, generated by the control and protection device, applied to the cell modules. The method comprises the following steps:
A) detecting a failure of a cell module,
B) analysing the failure,
C) determining the type of failure, and
D) controlling, in dependence of the failure type, the module such that zero output voltage is provided at its output voltage AC terminal ($U_{AC}$).

The number of cells in series in each phase is proportional to the AC voltage rating of the system and can consequently include a large number of cells in series.

Due to the large number of cells in series and to provide a high level of reliability and availability, a failure in a single cell should normally not lead to a tripping of the converter and consequently some type of bypass arrangement is needed, so that the faulty cell can be kept in circuit while the converter is running until the next planned service and maintenance of the converter.

The mechanical design of the cell must therefore be such that a short circuit (shoot through) failure in an IGBT module should not lead to any damage to the surrounding components.

The inventors have realized that if an industrial IGBT module is used and a failure occurs then the IGBT module would most probably explode resulting in that material is spread to the surrounding areas and then compromising the function of neighbouring cell modules, or even the entire system. Therefore some special design and protection is needed in the event of an exploding IGBT in order to allow continued operation after this failure utilizing the selected bypass arrangement.

According to an embodiment of the present invention, the full-bridge converter is divided into two mechanically separated units each containing a phase leg so that a failure in one phase leg does not damage the second phase leg which allows the possibility of providing the bypass means suggested above in connection with embodiments disclosed above without the use of mechanical switches.

Figure 11:
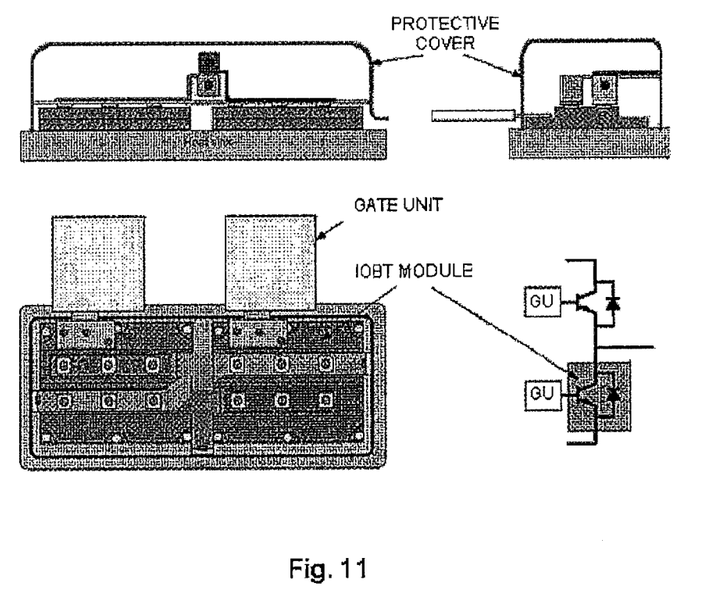
FIG. 11 illustrates a further embodiment of the present invention.

FIG. 11 illustrates two side views (above), a top view (below to the left), and a schematic phase leg (below to the right), of a simplified design concept for the construction of each phase leg. The design is protected by a protective cover that facilitates directing the pressure from a possible explosion away from sensitive parts of the converter.

Figure 12:
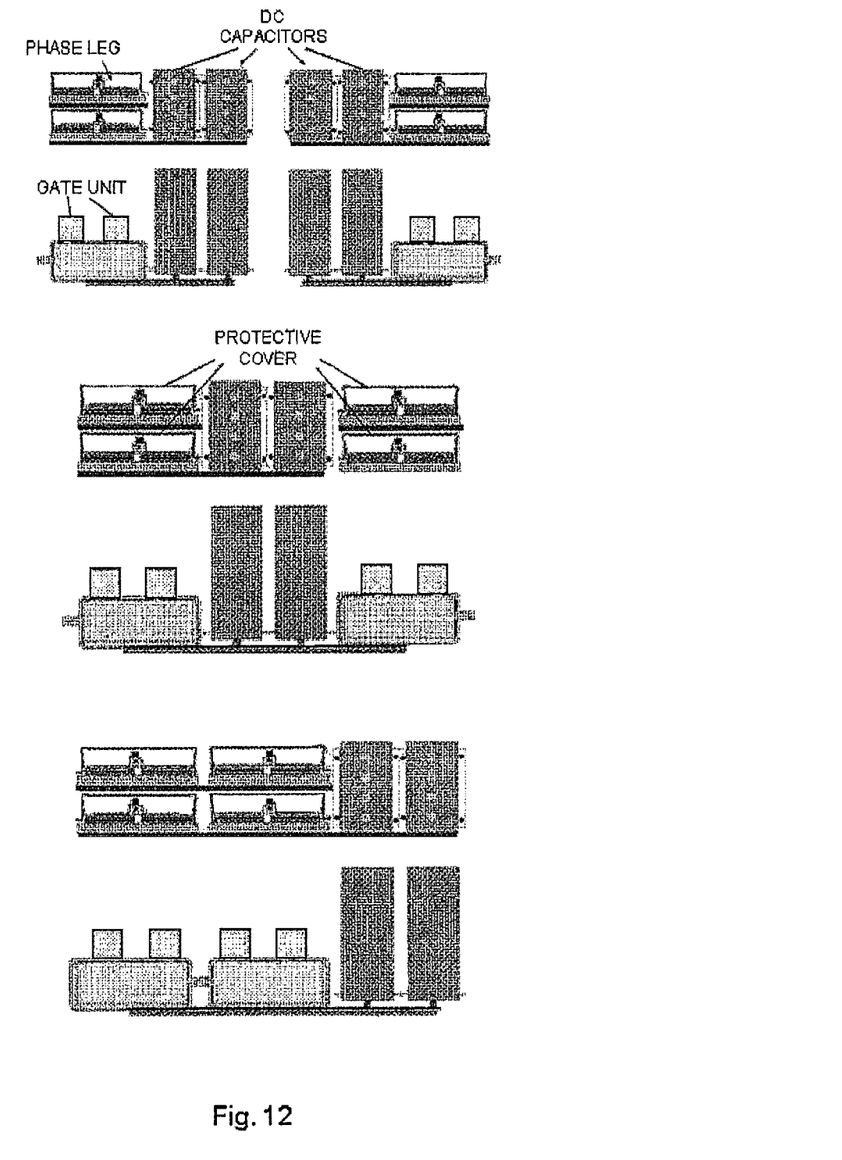
FIG. 12 illustrates another embodiment of the present invention.

As illustrated in FIGS. 11 and 12 the protective cover completely encloses both valves of one phase leg.

Preferably, the protective cover is essentially a box with rectangular surfaces, having an upper surface and side surfaces and being open in the bottom for insertion of the half-bridge. The cover is attached to the circuitry by use of any suitable attachment means, e.g. screws, hatches, glue, or a suitable frictional coupling. Naturally other geometrical shapes may be possible as long as the protective purpose is achieved, e.g. having an elliptical cross-section.

Preferably the protective cover is made from a material that possesses some degree of flexibility in order to facilitate mounting and attachment, and furthermore to facilitate arranging the electrical connections. Further requirement with regard to the used material is naturally that it should withstand heat and fire and having a mechanical strength that withstand outer mechanical stresses. Many different materials would be possible to use, e.g. plastic materials.

Thus, the protective cover has two purposes, it protects the circuitry from the outside and also protects the neighbouring environment from contamination.

The electrical connections to the phase leg are achieved using busbars with certain flexibility in the construction to prevent mechanical damage to the busbars outside the protective cover.

In the figures illustrating the protective cover also gate units (GU) and DC capacitors are shown. These are preferably arranged outside the protective cover.

In FIG. 12 side views and top views are shown, respectively, for three different alternative configurations.

At the top is seen left and right mounting of the phase leg in relation to the DC capacitors. The mid figure illustrates a parallel connection of a phase leg according to a first alternative, and the lowest figure illustrates a parallel connection of a phase leg according to a second alternative. For sake of simplicity not all parts are explicitly identified in the figure.

The busbar design is also made so that the AC connection may be realized either on the left or the right side of the module allowing greater flexibility in the valve construction as well as simplifying parallel connection of phase legs for high power needs. These different connection possibilities are exemplified in the figures.

In the FIGS. 11 and 12 are illustrated various arrangements where the protective cover e.g. easily facilitates stacking of the components.

The present invention is not limited to the above-described preferred embodiments. Various alternatives, modifications and equivalents may be used. Therefore, the above embodiments should not be taken as limiting the scope of the invention, which is defined by the appending claims.

What is claimed is:

1. A modular voltage source converter comprising one or more phases, each of said phases comprising one or more converter cell modules connected in series to each other, each of said converter cell modules comprising a first and a second phase leg with self-commutated valves, an output voltage of said voltage source converter is controlled by control signals applied to said converter cell modules, each converter cell module haven an output voltage AC terminal($U_{AC}$).

wherein in case of a failure in the phase leg of the converter cell module, said failed converter cell module is controlled only by the control signals controlling the valves of the second, non-faulty phase leg of said failed converter cell module, such that a zero output voltage is provided at the output voltage AC terminal ($U_{AC}$).

2. The voltage source converter of claim 1, wherein an additional number of converter cell modules are provided in each phase to ensure trip free operation during service interval.

3. The voltage source converter of claim 1, wherein each of said converter cell modules comprises four valves arranged in a full-bridge connection, and each of said valves is of a press pack design wherein the valve, upon a failure, enters a short circuit mode.

4. The voltage source converter of claim 1, wherein each of said converter cell modules comprises four valves arranged in two half-bridge connections, and wherein said half bridge connection comprises two of said valves.

5. The voltage source converter of claim 3, wherein each of said converter cell module is assigned a gate unit being physically connected to the valve, said control signals are valve turn on and turn off signals applied via said gate unit, and said gate unit is adapted to receive detection signals from the cell module.

6. The voltage source converter of claim 1, wherein each valve comprises an insulated gate bipolar transistor (IGBT) with an anti-parallel diode.

7. The voltage source converter of claim 1, further comprising a cell control and protection unit arranged to generate a fault signal if any fault is detected in any of said converter cell modules, said fault signal is applied to a control and protection device responsible for the overall control of the voltage source converter.

8. The voltage source converter of claim 7, wherein the total output voltage from the converter is maintained by controlling, by said control signals, non-faulty cell modules to increase their output voltages to compensate for zero output voltage from one or more faulty cell modules in accordance with a fault handling control algorithm.

9. The voltage source converter of claim 8, wherein said fault handling control algorithm is applied by said control and protection device when a fault signal is detected.

10. The voltage source converter of claim 6, wherein if the diodes in a faulty phase leg are healthy and the IGBTs are not short circuited, the other phase leg of a faulty cell will then be operated at fundamental switching frequency.

11. The voltage source converter of claim 6, wherein if one IGBT is short circuited, then the zero output voltage will be achieved by only switching the IGBT in the other phase leg, opposite to the short circuited IGBT, while keeping the other IGBT in that healthy phase leg turned off resulting in that current will only flow in the IGBT in the other phase leg, opposite to the short circuited IGBT, and the short circuited IGBT.

12. The voltage source converter of claim 1, wherein said three phases are connected in a delta configuration.

13. The voltage source converter of claim 1, wherein said three phases are connected in a Y configuration.

14. The voltage source converter of claim 1, wherein protective covers are arranged such that one protective cover is provided to enclose two valves of a cell module in order to protect the environment in case of fire or explosion, the protective cover is essentially a box having rectangular surfaces having an open bottom surface and encloses completely the two valves.

15. A method in a voltage source converter based on a converter cell topology, said converter comprising one or more phases, each of said phases comprising one or more series-connected converter cell modules connected to each other, each of said converter cell modules comprising a first and second phase leg with valves, an output voltage of said voltage source converter is controlled by control signals, generated by a control and protection device, applied to said converter cell modules, each converter cell module having an output voltage AC terminal ($U_{AC}$), wherein the method comprises the following steps:
- A) detecting a failure in the first phase leg of a converter cell module,
- B) analysing the failure,
- C) determining a failure type, and
- D) controlling, in dependence of the failure type, the valves of the second non-faulty phase leg of the converter cell module such that a zero output voltage is provided at its output voltage AC terminal ($U_{AC}$).

16. A modular voltage source converter comprising one or more phases, each of said phases comprising one or more converter cell modules connected in series to each other, each of said converter cell modules comprising a first and a second phase leg with self-commutated valves, an output voltage of said voltage source converter is controlled by control signals applied to said converter cell modules, each converter cell module having an output voltage AC terminal ($U_{AC}$),
- wherein in case of a failure in the phase leg of a converter cell module, said failed converter cell module is controlled only by the control signals controlling the valves of the second, non-faulty phase leg of said failed converter cell module, such that a zero output voltage is provided at the output voltage AC terminal ($U_{AC}$), and
- wherein for each converter cell module four external diodes are arranged in parallel to each of the valves of the module, said external diodes are arranged separately from, and are protected from the cell module, and said external diodes are used upon failure of said cell module(s).

* * * * *